March 28, 1933.  G. W. GILLE  1,903,233
APPARATUS FOR SUPPLYING AIR UNDER PRESSURE
Filed Feb. 16, 1928
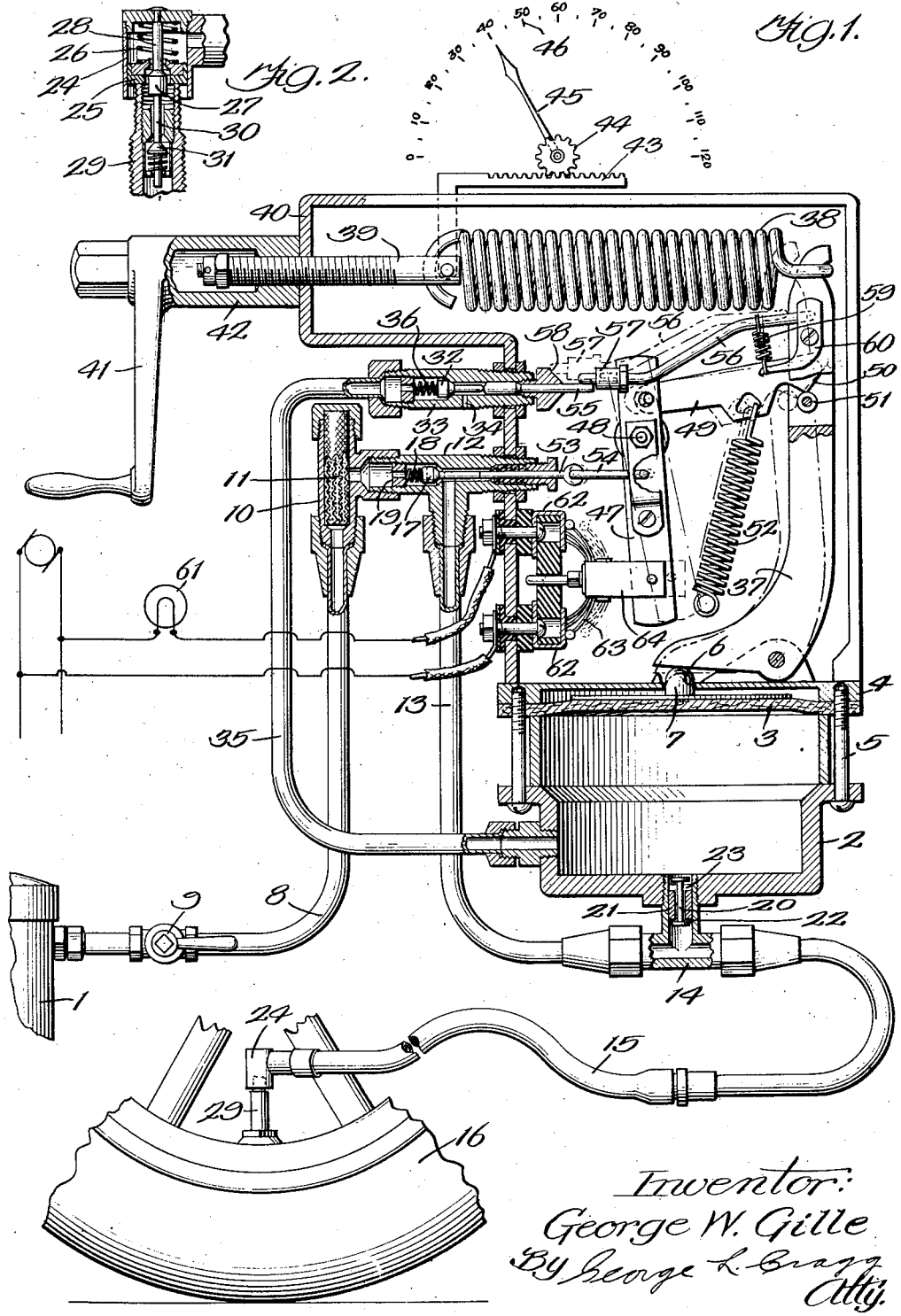

Patented Mar. 28, 1933

1,903,233

UNITED STATES PATENT OFFICE

GEORGE W. GILLE, OF BRYAN, OHIO, ASSIGNOR TO SERVICE STATION EQUIPMENT COMPANY, OF BRYAN, OHIO, A CORPORATION OF DELAWARE

APPARATUS FOR SUPPLYING AIR UNDER PRESSURE

Application filed February 16, 1928. Serial No. 254,803.

My invention relates to apparatus for supplying air, under pressure, to receivers and, in one embodiment, is of particular service in connection with pneumatic tire inflating equipment which is inclusive of a source of air under pressure, an expansible chamber, a valve having a port serving to establish communication between said chamber and source and which valve is constrained to close said port, there being a channel through which air may be supplied to a receiver, the tire, and to which air is also supplied through said port, said channel having communication, preferably constricted, with said chamber, a valve being preferably in said channel for obstructing the flow of air therethrough, and mechanism in controlling relation to the first valve and operable by a movable wall portion of said chamber when this wall portion is moved by the pressure of air within the chamber and serving, when operated, to enable closure of the first aforesaid valve, the second aforesaid valve normally serving to maintain air pressure within said chamber to normally maintain the first aforesaid valve closed.

In accordance with my invention, I provide a relief valve having a port serving to establish communication between said chamber and external air, this valve being constrained to close this port, and I preferably employ mechanism also controlled by a movable wall portion of said chamber and constrained to operate upon reduction of the air pressure in said chamber and, in thus operating, causing the relief valve to open. In the preferred embodiment of the invention, the mechanism which serves to open the relief valve is almost instantly deprived of its opening influence upon this valve to permit closure of the valve instantly after the pressure in the chamber has been relieved. In the preferred embodiment of the invention, the chamber is a so-called diaphragm chamber in which the diaphragm constitutes a flexible wall portion of the chamber which permits the chamber to expand and contract.

My invention is of particular utility in connection with the apparatus disclosed in Patent No. 1,618,953, dated February 22, 1927. The apparatus disclosed in that patent operates intermittently until the desired pressure is built up in the tire or other receiver. That is, there are successive charges of air which are admitted to the tire, the pressure in the chamber having the flexible wall or diaphragm slowly receding after each charge. The working pressure of the air in the aforesaid chamber is maintained while the apparatus is idle by the valve in the delivery hose or pipe that is connected with the tire in order to maintain the valve closed that controls the flow of air from the source to this hose and the chamber. By providing the relief valve and operating it when the pressure in the chamber first commences to recede, the reduction of the pressure in the chamber, preferably to that of the atmosphere, is quickly accomplished so that each operation of the apparatus is quickly completed, an important feature, especially if the aforesaid chamber has its air receiving capacity enlarged for the purpose of increasing the efficiency and accuracy of the equipment, it being desirable to reduce the pressure of the air in the chamber having the flexible wall to that of the atmosphere each time the inflation of a tire is initiated in order that the equipment may be quickly restored to uniform initial condition in preparation for each tire inflating operation. The venting device of my invention being effective to permit the pressure of the chamber to be quickly reduced to that of the atmosphere immediately upon the connection of each succeeding tire, the tires may be connected with the equipment in quick succession, an advantage which is of particular importance where tires are inflated in large quantities in factories.

The invention will be more fully explained by reference to the accompanying drawing in which Fig. 1 is a view illustrating the preferred embodiment of the invention, a part of the mechanism being shown in elevation, a part in section, and other portions of the equipment being diagrammatically illustrated; and Fig. 2 is a sectional view illustrating the valve structure in the end of the air supply pipe which is to be connected with the tire and the nipple that is permanently connected with the tire.

The apparatus illustrated includes a tank 1 in which air is stored at any suitable pressure, say, one hundred and fifty pounds. An expansible chamber 2, commonly termed a diaphragm chamber, is provided with a flexible circular diaphragm 3 which constitutes one end wall of the chamber. The diaphragm is held in place by means of a cap 4 which is clamped against the periphery of the diaphragm by means of the clamping bolts 5. The cap 4 has a central perforation 6 which affords access to the atmosphere to prevent the trapping of air between the cap and said diaphragm or flexible wall 3. The diaphragm carries a button 7 which extends through the opening 6 to the exterior of the cap 4 for the purpose to be hereinafter set forth.

The chamber 2 is connected with the tank 1 preferably through the intermediation of a pipe 8 which extends from the tank 1 and includes a hand valve 9 which is constantly in open adjustment when the apparatus is available for use. Said pipe discharges into a chamber 10 that is connected therewith and which contains a filtering screen 11 for the purpose of removing impurities from the air which is flowing through the system. The chamber 10 discharges into a valve casing 12 and this valve casing discharges into a pipe 13 which is connected by means of a T 14 with the interior of the chamber 2 and the service piping of hose 15 which is to discharge into the tire or other receiver 16. The casing 12 contains a self closing valve structure which is inclusive of the valve 17, proper, a coiled spring 18 pressing upon this valve in a valve closing direction and an abutment 19 against which the outer end of said spring presses. When said valve 17 is opened as hereinafter specified, air flows from the tank 1 through the constantly opened valve 9, the chamber 10, the casing 12 and the valve port in this casing, to the T 14, the air dividing at the T, the major portion of the air flowing through the service hose 15 into the tire 16 and a minor portion flowing into the chamber 2, there being a construction in the stem of the T 14 to retard the flow of air into and out of said chamber.

In the apparatus illustrated, there is an upright pin 20 having a head on each end, the stem of the pin being loosely received within the bore of a sleeve 21 which is tightly fitted within the stem of the T 14. When the air is flowing through the pipe or hose 15, the bore in the sleeve 21 is closed by the lower head of the elevated pin except for the shallow and narrow radial passages 22 formed in the lower end of the sleeve 21, these passages permitting air to pass by the lower pin head into the bore of the sleeve. Radial passages 23 are formed in the upper end of the sleeve 21 but are of such increased depth and width so as not by themselves to impede the flow of air from the chamber 2 when the pin drops, the upper head of the pin being sufficiently small in diameter to permit this result. Thus the flow of air into and out of the chamber 2 is restricted due to the constriction afforded by the sleeve 21 and the pin 20 within the bore of the sleeve, but the flow of air into said chamber is retarded to a greater extent than its exit due to the larger capacity of the upper passages 23.

The service hose 15 terminates in a cylindrical valve chamber 24 which contains a piston 25 which is pressed upon by a coiled spring 26 contained in the cylinder. A valve 27 is centrally disposed within said cylinder, this valve being fixed in relation to the cylinder by means of the valve stem 28. The piston is formed with a port which is opened or closed according to the position of the piston in the cylinder. When the hose 15 is uncoupled, the spring 26 moves the piston 25 against the valve 27 whereby the port in the piston is closed. When the hose 15 is coupled with the tire nipple 29, the nipple enters the cylinder 24 and presses the piston 25 away from the valve 27 to open the port in the piston. The valve 27 also presses downwardly upon the valve stem 30 to open the valve 31 in the nipple, the hose 15 thus being in communication with the interior of the tire 16.

In accordance with my invention a relief valve 32 is provided for quickly exhausting the air in the chamber 2 sufficiently to reduce the air in the chamber to atmospheric pressure to enable the quick operation of mechanism, to be hereinafter described, whose operation is controlled by the diaphragm or wall 3. Said relief valve 32 has a casing 33 which is formed with a port, in the bore of the casing, which is normally closed by the valve. Said casing also has a vent 34 which leads directly to the atmosphere. The casing 33 is desirably placed in communication with the chamber 2 by means of a pipe 35 and the interior of the chamber is placed in communication with the external atmosphere through the pipe 35 and the bore of the casing 33 when the valve 32 is unseated against the force of the spring 36 which normally closes this valve.

Both valves 17 and 32 are governed by the diaphragm or flexible chamber wall 3 through the intermediation of suitable mechanism, the preferred form of which will now be described. A bell crank lever 37 is journaled at its elbow upon the cap 4. This bell crank lever has a comparatively short horizontal arm which is in constant engagement with the button 7 which is provided upon the top side of the flexible wall 3. One end of a horizontal coiled spring 38 is hooked upon the upper end of the longer and upright arm of the bell crank lever. The other end of the coiled spring 38 is hooked into engagement with a horizontal threaded rod 39 which passes freely through the casing 40 that is provided for the mechanism that is controlled by the wall 3. A hand crank 41 has its hub 42 screwed upon the outer end of the rod 39. By turning this crank, the tension of the spring 38 may be adjusted, the greater the tension upon the spring 38, the greater the air pressure required within the chamber 2 to move the bell crank lever 37 against the force of said spring. When the pressure within the receiver has been built up, to the extent predetermined by the adjusted tension of the spring 38, the pressure of the air upon the wall 3 is sufficient to move the bell crank lever to the idle position shown by full lines in Fig. 1 in which position the valves 17 and 32 are both closed, as the parts controlling valve 17 move to the position shown in dotted lines in Fig. 1, the tire filling operation then being concluded, it being understood that when the tire is filled, there are static pressures in the receiver 16 and the chamber 2 that are equal. An indicating device is employed to aid in the determination of the pressure which is to be received in the tire 16 and at which the flow of air through the piping 15 is to be cut off. This indicating device may be inclusive of a rack 43 which may travel with the rod 31 and a pinion 44 having a stationary axis of rotation and carrying a pointer 45 which sweeps over the measuring scale 46.

The illustrated apparatus which controls the position of the valve 17 is also inclusive of a rocking arm 47 which has a stationary pivot 48 between its ends. A cam arm 49 is freely connected at one end with the arm 47 and is provided with a cam formation 50 at its other end which cooperates with the cam roller 51 provided upon the bell crank lever 37. A coiled spring 52 pulls downwardly upon said cam arm 49. When the apparatus is idle, the arms 47 and 49 are in the positions shown by dotted lines and the bell crank lever is in the position shown by full lines, it being remembered that the chamber 2 contains air under sufficient pressure to hold the bell crank lever in this idle position due to the closure of the valve 27 in pipe 15. During this idle condition, the pin 53 which is coupled with the arm 47 by the link 54 is sufficiently withdrawn from the stem of the valve 17 to permit the spring 18 to close this valve whereby communication between the tank 1 and the chamber 2 is obstructed. When the pressure within the chamber 2 drops intermittently as during the process of filling the tire or when a new tire is coupled with the equipment, the wall 3 will become lowered from the idle position shown in full lines in Fig. 1, permitting the spring 38 to move the bell crank lever 37 counterclockwise to a point where the cam roller 51 will be upon the left of the crown of the cam 50 whereupon the spring 52 will snap the arm 49 downwardly to bring the arm 47 to the full line position shown in Fig. 1 and thereby open the valve 17 through the intermediation of the link 54 and the pin 53. Each time the flexible chamber wall 3 is lowered from the normal position shown in Fig. 1 and due to the reduction of the pressure in the chamber 2, whether this lowering occurs intermittently during the process of filling one tire or occurs when a new tire is coupled with the equipment, the valve 32 is opened in order that the reduction of the pressure in the chamber 2 to that of the atmosphere may be quickly finished, this valve being very quickly closed after it is opened in order that the pressure in said chamber 2 may be built up. Since the passage through valve 32 and vent 34 is greatly in excess of the passage through restricted passages 22, the pressure in chamber 2 is quickly reduced by opening of the valve 32 without any considerable passage of air from connection 14 to chamber 2 during the time valve 32 is open.

The mechanism for thus opening the valve 32 is inclusive of a pin 55 which abuts against the stem of the valve 32 and which is moved against said valve stem to open this valve when the wall 3 drops and the bell crank lever 37 moves counterclockwise toward the position shown in dotted lines. During this movement of the bell crank lever 37, the rod 56 is pushed to the left by the bell crank lever, the shoulder 57 upon the rod, which is normally very close to the right hand end of the pin 55, pushing the pin 55 to the left to open the valve, continued movement of the bell crank lever 37 and a counterclockwise direction carrying the left hand end of the rod 56 upon the stationary cam 58, this cam lifting the rod 56 out of engagement with the rod 55 to permit the spring 36 to close the valve 32. The valve 32 is thus momentarily opened during the period in which the wall 3 is descending and the bell crank lever 37 is moved counterclockwise. The rod 56 is pivoted at its right hand end upon the lever 37. A coiled spring 59 is anchored at one end to a bracket 60 that is carried by the bell crank lever 37, the other end of this spring being secured to the rod 56. This spring serves to press downwardly upon this rod to ensure the location of the shoulder 57 in front of the right hand end of the pin 55 when the lever 37 is restored to the idle position shown in full lines. Opening relief valve 32 allows the downward movement of diaphragm 3 to be completed quickly, thereby insuring the prompt opening of valve 17 whenever pressure in chamber 2 drops to that at which rod 39 is set. Valve 32 remains open only a very short time, but this short time is sufficient to reduce pressure in chamber 2 nearly to that of the external atmosphere.

After valve 32 is closed and valve 17 is opened by the completion of the movement of rod 56 to the left, pressure from T 14 flows through restricted passages 22 into chamber 2 until the pressure in the chamber rises sufficiently to move diaphragm 3 and close valve 17. The time which this requires is increased by a large chamber 2 and by a low pressure in the chamber at the time valve 17 is opened. The use of relief valve 32 makes possible the prompt opening of valve 17 with a large chamber 2 and also makes possible a low pressure in chamber 2 at the time valve 17 is opened, and thereby materially increases the time during which valve 17 remains open at one pulsation of the device.

In order that the condition of use of the apparatus may be indicated, I have provided a signal such as a lamp 61 having a circuit which terminates in contacts 62 which are bridged by the switch blades 63 during the flow of air through the system, these switch blades having a mounting 64 by which they are secured to the lower end of the arm 47. When the tire has been filled, the switch blades will be disconnected from the contacts 62 and the lamp 61 will cease to glow.

Changes may be made without departing from the invention.

Having thus described my invention, I claim:

In apparatus for supplying air under pressure to a receiver, a source of air under comparatively high pressure, a conduit leading from said source and adapted to be connected with a receiver, a main valve between said source and said conduit, an expansible chamber connected to said passage by a restricted opening, means actuated by the expansion and contraction of said chamber to close and open said main valve, a relief valve for said chamber and means for opening the relief valve when the chamber contracts to a predetermined volume and for closing said relief valve upon the completion of the contraction of said chamber.

In witness whereof, I hereunto subscribe my name.

GEORGE W. GILLE.